United States Patent [19]

Albertson

[11] Patent Number: 4,552,259

[45] Date of Patent: Nov. 12, 1985

[54] RESIN-REINFORCED, NODULAR PLATED WET FRICTION MATERIALS

[75] Inventor: Clarence E. Albertson, Villa Park, Ill.

[73] Assignee: Borg-Warner Corporation, Chicago, Ill.

[21] Appl. No.: 625,333

[22] Filed: Jun. 27, 1984

[51] Int. Cl.$^4$ ............................................. F16D 13/00
[52] U.S. Cl. ......................... 192/107 M; 188/251 M; 188/251 A
[58] Field of Search ............. 192/107 M; 188/251 M, 188/251 A

[56] References Cited

U.S. PATENT DOCUMENTS

| | | |
|---|---|---|
| 3,184,009 | 5/1965 | Reinsch . |
| 3,191,734 | 6/1965 | Batchelor et al. . |
| 3,293,109 | 12/1966 | Luce et al. . |
| 3,390,750 | 7/1968 | Albertson . |
| 3,606,665 | 9/1971 | Glucoft . |
| 3,841,949 | 10/1974 | Black ............................... 192/107 M |
| 4,018,264 | 4/1977 | Albertson . |
| 4,202,432 | 5/1980 | Komori . |
| 4,351,885 | 9/1982 | Depoisier et al. ............. 188/251 M |

*Primary Examiner*—Larry I. Schwartz
*Attorney, Agent, or Firm*—Richard J. Schlott

[57] ABSTRACT

Porous wear facings formed of a nodular plated metallic coating are useful as friction elements in wet clutches and the like. The wear and friction characteristics of the wear elements may be further modified for particular applications by coating with phenolic resins, optionally including wear particles.

6 Claims, No Drawings

RESIN-REINFORCED, NODULAR PLATED WET FRICTION MATERIALS

BACKGROUND OF THE INVENTION

This invention relates to friction members such as friction plates for clutches and brakes, and more particularly to improved wear facing materials for wet clutches and brakes.

A typical composite plate or friction member for use in a torque transmitting element of the type operating in a wet environment, i.e., continuously run in a bath of circulating oil or other lubricant, comprises a rigid metal disc having a lining or wear facing affixed thereto. It is desirable that such wear facings be made of a friction material which is relatively porous so that they will readily absorb oil. Under compression, the lubricant is squeezed into the porous wear facings to effect smooth engagement of the friction members and to increase the friction level by dissipating surface oil films.

Asbestos has long been the principal component of friction members used in clutch and brake assemblies where severe operating temperatures and pressures occur. However, due to the accumulating evidence that asbestos may be carcinogenic to man, major efforts have been made to develop alternative friction materials which do not depend upon asbestos for their frictional properties and resistance to extreme temperatures. The more recent friction materials developed as replacements for the asbestos based compositions have employed a variety of glass fibers and infusible organic fibers embedded in a heat-curable organic binder. To provide increased mechanical strength and resistance to disintegration in response to centrifugal forces (burst strength), these materials have included therein continuous glass and/or infusible organic fiber. Fabrication of these materials, particularly when used in the manufacture of clutch facings, has been accomplished by first forming a continuous tape or strand, winding the tape to form a disc preform, then molding and curing the preform under heat and pressure to provide the clutch facing, as is shown for example in U.S. Pat. No. 4,244,994. Although suitable asbestos-free friction elements are provided by such processes, the complexity and cost factors are somewhat limiting. Further the use of these material in severe environments and/or under abuse results in inferior frictional characteristics and often results in increased wear.

Various sintered metal and ceramic compositions have been developed as frictional materials for use under severe conditions. In general, these materials comprise sintered lead bronzes or iron powders with friction reinforcers and dry lubricants. Among the additives commonly employed with the powdered metals are graphite, quartz, corundum, aluminum oxide, silica, mullite and the like. The sintered compositions or composites are generally formed by blending the powdered metals with the powdered or particulate non-metallic component, then compressing the powder in a mold at pressures of from 10,000 to 100,000 psi to provide a pressed wafer. The wafer is then sintered under pressure at elevated temperatures for extended periods to fuse the metallic component and entrap the non-metallic ingredients. The compressed wafer prior to being sintered is fragile and easily broken if mishandled during manufacture. Further, the sintered composite friction element is generally porous and has rather low mechanical strength. It has therefore been necessary to provide additional strengthening means in order to overcome these inherent deficiencies. For example, the friction element may be attached to a steel backing, normally by brazing, prior to the sintering operation to overcome the fragility of the compressed wafer and to add strength to the sintered friction element. Various organic binders such as coal tar pitch may be added to provide green strength to the wafer and thus avoid breakage of the fragile wafer during the sintering operation. Alternatively, monolithic friction elements having a layered structure comprising a first friction layer with appropriate friction and wear properties and second layer united thereto as a backing of adequate mechanical strength may be made by forming the element simultaneously from two powdered layers.

The sintering process thus lends itself to the production of a wide variety of highly durable metallic composites for use in most frictional materials applications. However, the friction characteristics of such composites are rather poor. Additionally, the sintering operation tends to heat-anneal and soften the backing plates where employed. The cost of their manufacture has been high, which has mitigated against the wide spread adoption for use in large volume applications such as in passenger vehicles.

A simplified, low-cost method for the manufacture of metallic friction materials would thus advance the development of asbestos-free friction elements.

SUMMARY OF THE INVENTION

The instant invention is a metallic friction member such as a torque transmitting element adapted for use in a clutch including a rigid backing member having a wear facing comprising a nodular plated metallic coating. The nodular plated coating is formed by electrodepositing copper dendrites, further electroplating the dendrites and the coining the plated surface to compact the nodules. The nodular plated and coined wear surface thus has a high degree of voids, which provides the requisite porosity for use as a friction element in a wet environment. The wear and friction characteristics of these wear surfaces may be further modified by coating with phenolic resin, by further plating of the nodules with metals such as bronze, and by the addition of wear particles to the phenolic resin coating, to provide friction elements useful in a wide variety of clutch applications.

DESCRIPTION OF THE PREFERRED EMBODIMENTS

The nodular plated metallic wear facings useful in the practice of this invention are produced by first electroplating dendrite copper at a relatively high current on a metallic surface, overplating the dendrites with copper at a lower current density then coining the plated dendrites to compact the nodules and flatten the wear surface. Techniques for dendritic plating of copper and overplating the dendrites are known in the art and are described for example in U.S. Pat. Nos. 3,293,109 and 4,018,264. In the practice of this invention, the nodular plated copper is deposited on a metallic substrate or surface in a series of successive plating steps, to build up a nodularized copper wear surface having a thickness of from about 0.01 to about 0.05 inches, preferably from about 0.02 to about 0.03 inches. Each deposition step of depositing the copper dendrites and overplating with copper is followed by coining in a press under a pressure of from 200 to 10,000 psi, preferably from 500 to 3,000 psi, to flatten the wear surface and compact the nodules.

The strength and surface wear characteristics of the nodular plated wear surface may be further improved by overplating the final deposit of copper nodules on the surface with bronze to a thickness of 0.001 to 0.005 inches prior to the final coining step. Alternatively, bronze may be employed in place of copper for overplating the copper dendrites in each of the plating steps prior to the coining operation to provide a harder, more wear-resistant wear surface.

The friction characteristics of the nodular plated wear surfaces of this invention may be further modified by coating the nodules with a phenolic resin, and by embedding particulate friction material such as friction resin granules formed of cashew nut shell resin prior to coating the nodules with phenolic resin. These materials serve to modify the friction character of the nodular plated surfaces and to further strengthen the nodular plating. However, the nodular plated friction members may also be employed without further modification.

The metallic substrate or surface upon which the wear surface is deposited may be formed of any metal or metallic alloy material suitable for use in the particular application envisioned, such as, for example steel, copper, bronze and the like. The wear surface may be directly formed for example on a surface of a steel torque transmitting element such as a clutch plate, or alternatively on the surface of a metallic wear element which is adapted for attachment to the torque transmitting element.

The practice of this invention will be better understood by consideration of the following examples, which are provided for illustrative purposes.

EXAMPLE 1

Copper Coupons, $3'' \times 3'' \times 0.031''$, were washed with liquid detergent, water-rinsed, sandblasted with 100 grit silicon carbide, and pressed at approximately 2300 psi to ensure flatness. The coupons were then etched by dipping for 15 sec. in an aqueous acid bath containing 17 wt% $HNO_3$ and 17 wt% $H_2SO_4$ at 71° C.

The coupons were immersed in a bath containing 170 g/l $CuSO_4.5H_2O$, 60 g/l $H_2SO_4$ and 0.01 wt% surfactant. The coupons were plated with copper from a consumable copper anode at 30 amps (480 amp/sq ft) of direct current for 30 sec., then at 5.0 amps (50 amp/sq ft) for 45 minutes, at 25° C. The coupons were removed from the bath, rinsed first with deionized water, then with acetone and air-dried. The coupon surfaces were then coined by pressing at 5,000 lbs (approx. 550 psi) in a hydraulic platen press.

The plating process was repeated three times, after a three second acid etch before each plating, to provide a nodular plated wear surface having a thickness of approximately 0.030 inches. The coining pressure was increased after the final plating to 20,000 lbs (approx. 2200 psi). The percentage of voids in the plated layer was 58% on a volume basis.

EXAMPLE 2

Nodular plated copper coupons were prepared substantially by the process of Example 1 but employing a plating bath containing 81 g/l $H_2SO_4$ and increasing to 20,000 lbs the coining pressure for each coining operation. The coupons were then bronze-plated in an aqueous plating bath containing 57.7 g/l sodium cyanide, 34.4 g/l cuprous cyanide, 12.7 g/l potassium hydroxide, 41.8 g/l potassium stannate and 53.8 g/l sodium potassium tartrate. A current of 3.5 amps (56 amps/sq ft) was employed, producing a 0.002 in thick bronze plating after 35 min. and 0.004 in after 70 min.

EXAMPLE 3

Nodular plated coupons prepared as in Example 1 were cut to form $1\frac{1}{4}''$ discs as test specimens. The nodular plated surface was modified by coating it with an alcohol-soluble phenolic resin. The discs were dipped in a 35% solids alcohol solution of the commercial phenolic resin, obtained from Schenectady Chemical Co. The samples were drained, blotted with paper towelling to remove the excess, dried in an oven at 120° F. for 45 min., then heated to 300° F. in an oven to cure the resin.

EXAMPLE 4

Nodular plated coupons, prepared as in Example 2 were cut into $1\frac{1}{4}''$ disc test specimens and coating with an alcohol-soluble phenolic friction resin as in Example 3. The coated discs, after blotting, were dusted with a particulate, fully-cured, high-friction phenolic resin derived from cashew nut shell liquid, obtained commercially from 3M Company as Cardolite NC-108-40. The samples were then dried in an oven at 120° F. for 45 min. and cured at 325° F. for 30 min. Discs designated 4A had 0.002 in. bronze coating; discs designated 4B had 0.004 in. bronze coating.

EXAMPLE 5

Nodular plated coupons prepared as in Example 1 were cut into discs and coated with phenolic resin and Cardolite NC-108-40 friction particles and cured as in Example 4.

FRICTION TESTING

The nodular plated materials were submitted to low velocity friction testing. Specimens of each material in the form of a $\frac{1}{8}''$ annulus having an o.d. of 1.125'', and an i.d. of 0.875'' were prepared and run against 1035 tumbled steel at 120 psi in Exxon 1933 Dexron oil at a sliding speed of 0–100 ft/min at ambient temperature, at 200° F. and at 300° F. The surfaces were run for 16 hrs at 120 psi and 50–60 ft/min, then in fresh fluid for 1 hr as the break-in portion of the test. A copper friction sample cut from an unplated coupon was provided as a Control A. Control B and C specimens were cut from commercial sintered bronze clutch plates. The test results are summarized in Table I.

TABLE I

| Ex[1] No. | Wear in | Ave Static Friction | | | Dynamic Friction (100 fps) | | |
|---|---|---|---|---|---|---|---|
| | | RT | 200° F. | 300° F. | RT | 200° F. | 300° F. |
| 1 | .005 | .142 | .142 | .150 | .082 | .091 | .102 |
| 3[2] | .0038 | .167 | .135 | .135 | .133 | .114 | .113 |
| | (.0004) | (.138) | (.133) | (.174) | (.095) | (.095) | (.123) |
| 4A | .0033 | .160 | .160 | .169 | .124 | .128 | .153 |
| 4B | .0018 | .163 | .142 | .140 | .146 | .137 | .144 |
| 5 | .0024 | .178 | .185 | .180 | .120 | .117 | .143 |
| Control A | .001 | .126 | .172 | .154 | .087 | .089 | .097 |
| Control B | 0008 | .130 | .120 | .143 | .051 | .089 | .120 |
| Control | .0020 | .139 | .118 | .121 | .114 | .111 | .113 |

TABLE I-continued

| Ex[1] No. | Wear in | Ave Static Friction | | | Dynamic Friction (100 fps) | | |
|---|---|---|---|---|---|---|---|
| | | RT | 200° F. | 300° F. | RT | 200° F. | 300° F. |
| C | | | | | | | |

Notes:
[1]Ex. No.: Friction specimens prepared from material of example number shown. Controls are: A = solid copper; B = commercial sintered bronze from Raybestos-Manhattan; C = Gempco commercial sintered bronze plate.
[2]Specimen of example 3 material was re-run after test at 300° F. Values in ( ) are for second run.

It will be apparent from a consideration of the test results for the friction materials of this invention, Examples 1-5, in comparison with those for the control examples, that the nodular plated materials exhibit quite useful static and dynamic friction properties (Example 1) which are further improved by coating the nodules with a phenolic resin (Example 3) and by adding a particulate friction resin to the phenolic coating (Examples 4 and 5). The wear properties of the uncoated materials are high, but are further improved by bronze plating (Examples 4A and 4B).

Clutch plates, prepared substantially in accord with the procedures of Example 4B, were submitted to dynamometer testing in clutch packs. The friction and wear properties of the material of this invention was quite comparable to the characteristics of the commercial sintered bronze clutch plates run in the same tests.

The invention will thus be seen to be a metallic friction member such as a torque transmitting element adapted for use in a clutch, including a rigid backing member having a wear facing comprising a nodular plated metallic coating, and a method for preparing wear facings. The wear facings may be further modified by coating with a phenolic resin, and by adding particulate friction materials to the surface. Further modifications and improvements will be apparent to those skilled in the art.

I claim:

1. A torque transmitting element adapted for use in a clutch comprising a rigid backing member and a wear facing affixed to said backing member, said wear facing comprising a nodular plated metallic coating further coated with phenolic resin.

2. The element of claim 1, wherein said nodular plated metallic coating is formed of copper.

3. The element of claim 1, wherein said nodular plated metallic coating is formed of copper and further coated by plating with bronze.

4. The element of claim 1 wherein said nodularized metallic coating is plated on a surface of said backing member.

5. A wear facing for friction elements comprising a nodular plated metallic coating formed by the steps of plating copper dendrites on a metallic substrate, overplating said copper dendrites with a metal selected from the group consisting of copper and bronze, pressing the plated copper dendrites at a pressure of from 200 psi to 10,000 psi, and repeating the plating, overplating and pressing steps to provide a nodular plated metallic coating having a thickness of from 0.01 to 0.05 inches.

6. The element of claim 5, wherein said nodular plated metallic coating is further coated with a phenolic resin.

* * * * *